A. Frost,
Cage Trap.

Nº 65,661.      Patented June 11, 1867.

Witnesses:      Inventor:
F. Lehmann      A. Frost
Robt Green      Per
     J. H. Alexander & Co
     attys

United States Patent Office.

A. FROST, OF SEYMOUR, INDIANA.

Letters Patent No. 65,661, dated June 11, 1867.

---

IMPROVEMENT IN ANIMAL TRAPS.

---

*The Schedule referred to in these Letters Patent and making part of the same.*

---

TO ALL WHOM IT MAY CONCERN:

Be it known that I, A. FROST, of Seymour, in the State of Indiana, have invented certain new and useful improvements in Animal Traps; and I do hereby declare that the following is a full, clear, and exact description of the same, reference being had to the accompanying drawings, and to the letters of reference marked thereon, in which—

Figure 1:
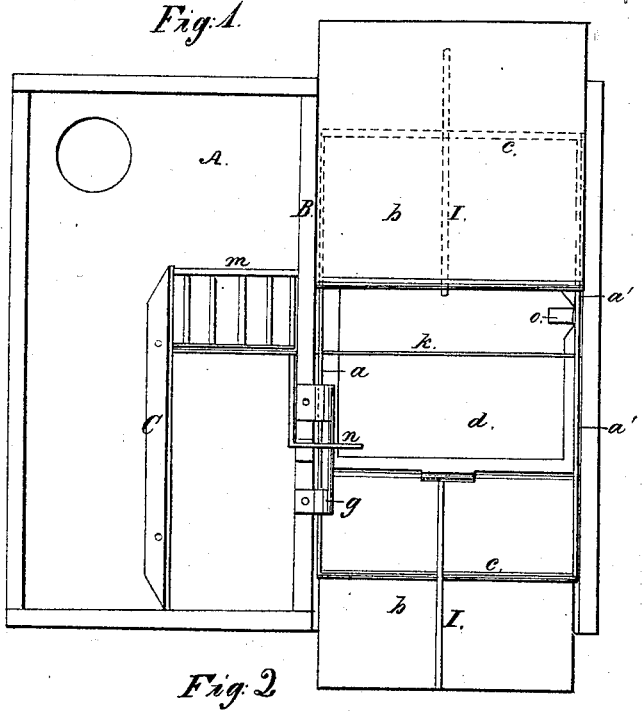

Figure 1 represents a plan view with the top removed.

Figure 2:
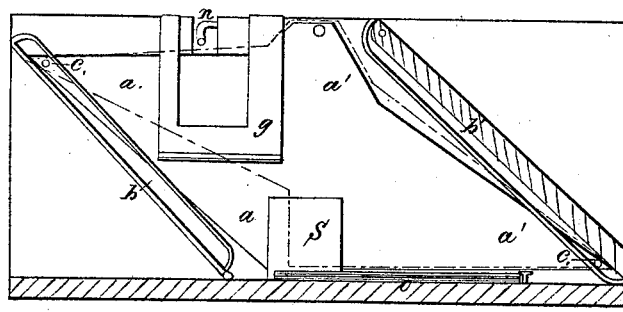

Figure 2, a side elevation, with one side removed in order to exhibit the shape of the levers.

A indicates the box, which may be made square. B is a partition which divides said box into two equal compartments, and is provided with a communicating hole, as represented by letter $s$ in fig. 2, sufficiently large for the animal which it is designed to trap to pass through. It will be observed that the compartment in which the levers work has no end pieces, but is left open for reasons more fully appreciated hereafter. $a\ a'$ represent two sheet or plate levers, the shape of which is indicated by the red and black lines in fig. 2, one of which serves as a door for separating the two compartments. Said levers are connected at their ends by means of wire or metal bars $c\ c$. $k$ represents a rod which passes through the centre and near the top of the strap. Upon this rod are hung the levers $a\ a'$, as seen in fig. 1. The lever $a$, indicated by black lines in fig. 2, is provided with a corresponding hole with the one already referred to in the partition B. $b\ b'$ represent doors. $b$ is made of tin or some light material, and is hinged at the bottom of the trap, while $b'$ is made much heavier, and is hinged near its top. Said doors are provided with loops $i\ i$, as fully shown in fig. 1. The bars $c\ c$, which connect the levers $a\ a$, pass between said loops and the doors. Thus it will be seen that in pressing the levers $a\ a'$ downward the door $b$ falls from the top, while door $b'$ rises from the bottom, leaving a clear and unobstructed passage through the compartment in which they are placed. $d$ represents a wide piece of metal, secured to the bottom of the compartment just referred to, and is designed to act as a tripping-platform or catch to lever $a'$ in setting the trap, by means of a slot, as indicated by letter $o$ in fig. 2. The piece of metal $d$ should possess spring sufficient that the weight of the animal will press it down and relieve the lever $a'$ from the slot $o$, thus causing an immediate closing of the doors and the entrapping of the animal. $g$ represents a hanger, secured loosely to the top of partition B. Said hanger is turned in from the bottom, as may be seen in fig. 2, and its object is to prevent the animal after being entrapped from pushing up the doors and escaping. $m$ represents a wire door, which is hinged between the partition B and half partition C. $n$ is a lever formed by the prolongation of one of the wires in door $m$. A slot is cut into the partition B to allow the lever $n$ to push against lever $a$, for the purpose of setting the trap. A hole is cut in the bottom of the trap to permit the animal to escape into a barrel or any other vessel prepared to receive him after being entrapped.

The operation is as follows: The trap being set with suitable bait, the animal, in getting on the platform $d$, at once relieves the lever $a'$ from the slot $o$, when the doors immediately close by reason of the greater weight of the door $b'$. The animal finding himself entrapped seeks to get out, and in doing so passes through the hole $s$, and under the wire door $m$, which in doing he resets the trap for the next rat or animal.

Having thus fully described my invention, what I claim, and desire to secure by Letters Patent, is—

1. The plate levers $a\ a'$, constructed and arranged so as to open or close simultaneously the doors $b\ b'$, substantially as specified.

2. The doors $b\ b'$, provided with loops $i\ i$, in combination with levers $a\ a'$, as and for the purpose set forth.

3. The spring-platform or treadle $d$, provided with slot $o$, for engaging with the lever $a'$, as and for the purpose described.

A. FROST.

Witnesses:
E. B. COLLINS,
F. S. POTTS.